United States Patent [19]

Saito et al.

[11] 4,321,631
[45] Mar. 23, 1982

[54] CONTROL METHOD AND DEVICE FOR REPRODUCING A HALFTONE DOT CUT AWAY ALONG A PICTURE OUTLINE

[75] Inventors: Isao Saito, Shiga; Makoto Hirosawa; Seiya Sakamoto, both of Kyoto, all of Japan

[73] Assignee: Dainippon Screen Seizo Kabushiki Kaisha, Kyoto, Japan

[21] Appl. No.: 169,265

[22] Filed: Jul. 15, 1980

[30] Foreign Application Priority Data

Jul. 26, 1979 [JP] Japan .................... 54-94275

[51] Int. Cl.³ ............................ H04N 1/40
[52] U.S. Cl. .................. 358/298; 358/283; 358/302
[58] Field of Search ............ 358/283, 298, 299, 302

[56] References Cited

U.S. PATENT DOCUMENTS 3,983,319  9/1976  Moe ..................................... 358/283

Primary Examiner—Howard Britton
Attorney, Agent, or Firm—Zarley, McKee, Thomte, Voorhees & Sease

[57] ABSTRACT

In a method for reproducing a halftone picture by scanning, wherein a brightness and a width of a recording light beam to be projected on a photosensitive material is suitably controlled by means of picture signals obtained from the scanning of an original picture, a control method for reproducing a halftone dot cut away along a picture outline is disclosed, wherein a position of an outline in an original picture is detected, wherein the intersection of the outline with a halftone dot is discriminated by comparaing the two positions of the outline and the dot, and wherein a part of the dot positioned inside the outline is exposed by the recording light beam. This method is carried out by using a control device according to the present invention, which is also disclosed.

5 Claims, 28 Drawing Figures

(I)

(II)

(III)

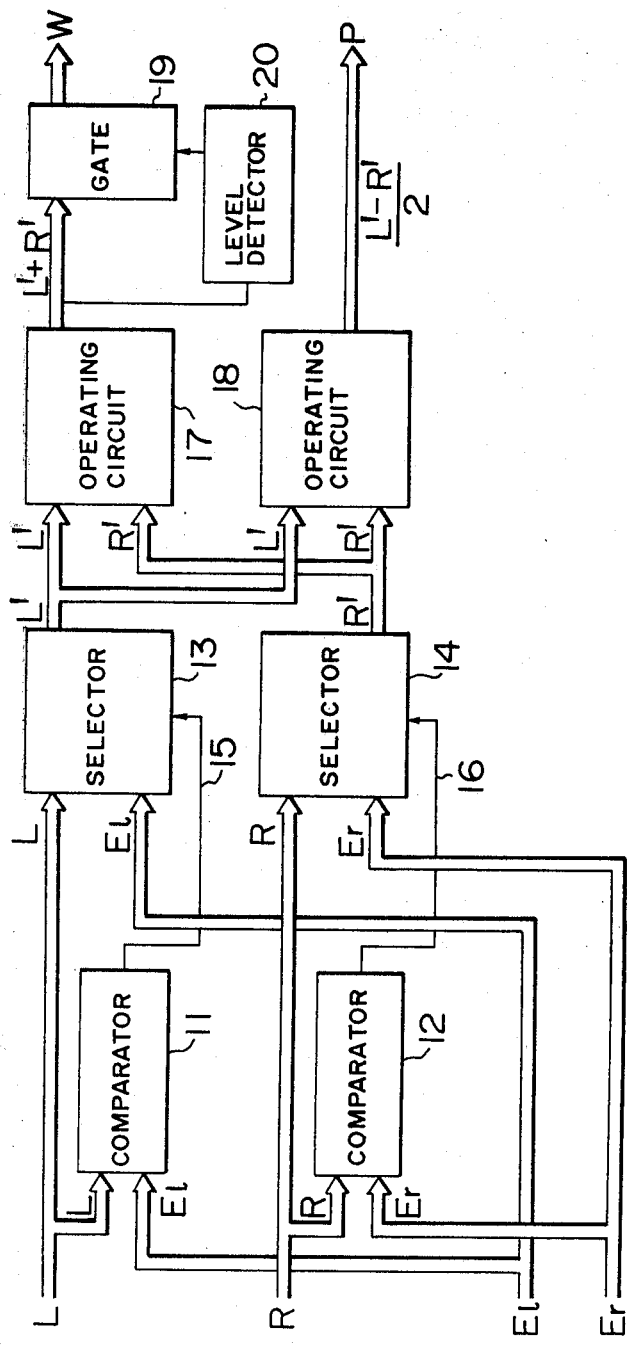

CONTROL METHOD AND DEVICE FOR REPRODUCING A HALFTONE DOT CUT AWAY ALONG A PICTURE OUTLINE

BACKGROUND OF THE INVENTION

This invention relates to a control method and device for reproducing a halftone dot cut away along an outline of a reproduction picture, for use in a picture reproducing machine such as a color scanner or a color facsimile, wherein a halftone picture is reproduced by scanning.

There are already known many methods for reproducing a halftone picture by means of a picture reproducing machine such as a color scanner for plate-making or a color facsimile according to picture signals picked up by scanning an original picture. For example, Japanese Patent Laying-Open Specification No. 54-79701 (Japanese Patent Application No. 52-145683) has been filed by the same applicant assignee as the present invention, and it discloses a machine for reproducing a halftone picture by scanning, as shown in FIG. 1.

In this application, as shown in FIG. 1, a light beam emitted by a light source 1 such as a laser tube is passed along its light axis through the first acoustooptical deflector element 2, a V-shaped aperture of an aperture plate 3, the second acoustooptical deflector element 4, and a focusing lens 5 in order to obtain a minute line image w. The deflector element used in this embodiment, as is already well-known, is of a type which makes use of the fact that elastic deformation in a crystal caused by ultrasonic waves can function as a diffraction grating. This deflector element is capable of suitably changing the pitch of the diffraction grating by controlling the frequency of the ultrasonic waves supplied to the crystal, so as to deflect the light beam at an adjustable diffraction angle. The deflector element is capable of oscillating at deflection frequencies and of controlling the amplitude of deflection angle as desired.

Hence, the first deflector element 2 diffracts the light beam vertically, i.e. in the Z direction, at a desired angle depending on the ultrasonic frequency supplied thereto so that the height of the light beam projected onto the aperture may be varied in order to vary the width of the light beam therethrough. The second deflector element 4 diffracts the light beam horizontally, i.e. in the Y direction, at a desired angle depending on the ultrasonic frequency supplied thereto so that the position of the light beam through the aperture may be shifted in the direction of its width. Thus, the width and the position of the line image w of the light beam can be varied by controlling the ultrasonic frequencies supplied to the two deflector elements 2 and 4, and by using this line image w the halftone picture can be reproduced onto a photosensitive material mounted to a recording cylinder, as shown in FIG. 2.

There are shown three halftone dot patterns to be recorded, having screen angles 45°, 0° and 15° with respect to a main scanning line S in FIGS. 2I, 2II and 2III. If left and right lengths which are obtained by dividing the width of the halftone dot into left and right parts by the scanning line S, are L and R, the entire length W of the line image w is expressed as follows.

$$W = L + R$$

In this embodiment described above, the pitch of the scanning lines of the color scanner for plate-making is smaller than that of the screen lines of a usual halftone screen, and thus several scanning lines cross one halftone dot area. Hence, one halftone dot is recorded by one scanning operation of one of the several scanning lines.

In FIGS. 2I or 2II the scanning line S which divides the halftone dot area into two equal parts is selected and along the scanning line selected the halftone dot is recorded. In FIG. 2III the scanning line S which passes through one corner of the halftone dot area is selected for recording the halftone dot.

In the embodiment shown in FIG. 2III, a diagonal line S' of the halftone dot area passes the one corner the scanning line S passes, and divides the halftone dot area into the two equal parts. If left and right lengths which are obtained by dividing the width of the halftone dot area in the direction perpendicular to the scanning line S into two left and right parts by the diagonal line S', are $\alpha$ and $\beta$, and the distance between the scanning line S and the diagonal line S' in the direction perpendicular to the scanning line S is $\sigma$, the lengths L and R are expressed in the following formulae.

$$L = \alpha - \sigma$$

$$R = \beta + \sigma$$

These formulae are satisfied in the embodiments shown in FIGS. 2I or 2II, wherein $\sigma = 0$.

Consequently, the lengths L and R are obtained from the lengths $\alpha$ and $\beta$ according to the above formulae and are then summed to give the entire length W. Then, the deflection control of the light beam by means of the first deflector element is so carried out that the length of the line image w may be the resulting entire length W.

A distance p between the scanning line S and the center of the length W of the line image w is given in the following formula.

$$p = (R - L)/2$$

In the embodiments shown in FIGS. 2I and 2II, R equals L, and accordingly p equals nought. Hence, it is unnecessary to diffract the light beam by the second deflector element. However, in the embodiment shown in FIG. 2III, R does not equal L and the light beam is to be deflected by the second deflector element. This deflection operation is controlled so that the center of the line image w may be moved along a one-dotted line C shown in FIG. 2III.

In this case, of course, the halftone dot area may be varied depending on the density of the picture signals. This can be carried out by changing the width and the position of the line image by controlling the two deflector elements.

According to this method, the halftone dots are always recorded in their entire forms. However, in practice, the halftone dots should often be cut away along the outline of the reproduction picture. In such a case, if no halftone dots are cut away along the outline, a faithful reproduction picture cannot be obtained.

SUMMARY OF THE INVENTION

It is an object of the present invention to provide a control method for reproducing a halftone dot cut away along an outline of a halftone picture, free from the above described defects, which is capable of reproducing a faithful reproduction picture and improving the resolving power.

It is also an object of the present invention to provide a control device for reproducing a halftone dot cut away along an outline of a halftone picture free from the above described defects, which is capable of reproducing a faithful reproduction picture and improving the resolving power.

According to the present invention there is provided in a method for reproducing a halftone picture by scanning, wherein a brightness and a width of a recording light beam to be projected on a photosensitive material is suitably controlled by means of picture signals obtained from the scanning of an original picture, a control method for reproducing a halftone dot cut away along an outline of the picture, comprising the steps of (a) detecting a position of an outline in an original picture, (b) discriminating the intersection of the outline with a halftone dot by comparing the two positions thereof, and exposing a part of the halftone dot the outline crosses, which is positioned inside the outline, by the recording light beam.

According to the present invention there is also provided in a machine for reproducing a halftone picture by scanning, wherein a brightness and a width of a recording light beam to be projected on a photosensitive material is suitably controlled by means of picture signals obtained from the scanning of an original picture, a control device for reproducing a halftone dot cut away along an outline of the picture, comprising (a) a width signal generator which outputs a width signal corresponding to a width of a halftone dot to be recorded, (b) a position signal generator which outputs an outline position signal corresponding to a position of an outline in an original picture, (c) a selector which compares with width signal and the outline position signal and selects one of the two signals, and (d) a controller which controls the length of the recording light beam according to the signal selected.

BRIEF DESCRIPTION OF DRAWINGS

In order that the present invention may be better understood, a preferred embodiment will now be described with reference to the accompanying drawings, in which:

FIG. 2II shows a case at which screen angle of the halftone dot pattern to be recorded is 0° with respect to the main scanning direction shown in arrow line (S);

FIG. 2III shows other case at which screen angle of the halftone dot pattern to be recorded is some 15° with respect to the main scanning direction shown in arrow line (S);

FIGS. 4II and 4III show graphs of values w and p obtained by relevant formulae according to the present invention;

FIGS. 8II and 8III show graphs of variations of the values L and R for recording the halftone dot, in which L is always positive, but R varies from a positive value to a negative value at a zero point;

FIGS. 15II and 15III show graphs of the values L' and R'; wherein the dot is cut away;

FIG. 17 is one of the block diagrams of a device shown in FIG. 1 for cutting away a halftone dot.

DESCRIPTION OF A PREFERRED EMBODIMENT

Figure 3:
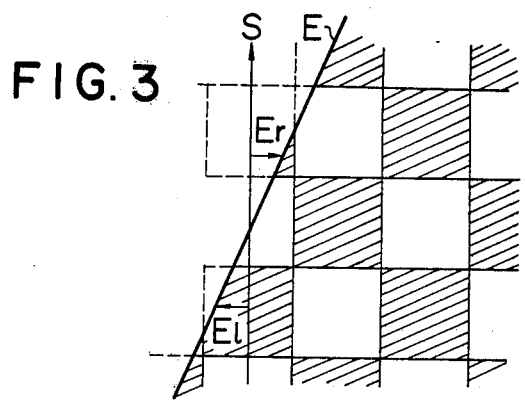
FIG. 3 shows a halftone dot pattern which is cut away along a picture outline for explaining a principle of a method of the present invention.

In FIG. 3 there is shown a halftone dot pattern having dot area of 50% which is cut away along an outline E of a reproduction picture, that is, the left hand side of the outline E is a dot area of 0%, or has a density of 0%.

Figure 2:
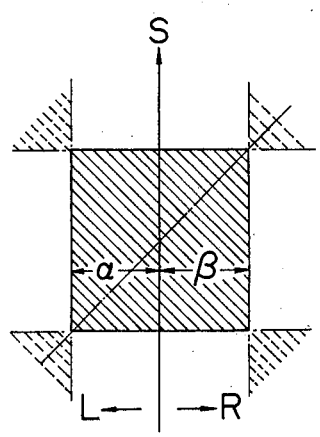
FIG. 2I shows a case at which screen angle of the halftone dot pattern to be recorded is 45° with respect to the main scanning direction shown in arrow line (S)
Figure 2:
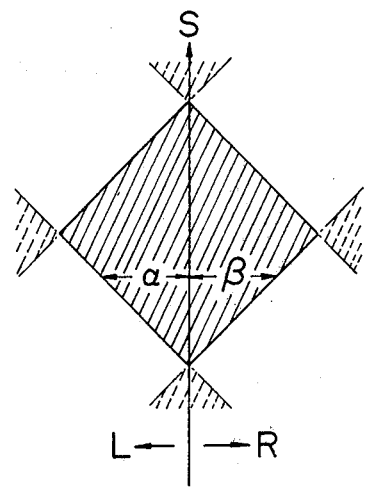
Figure 2:
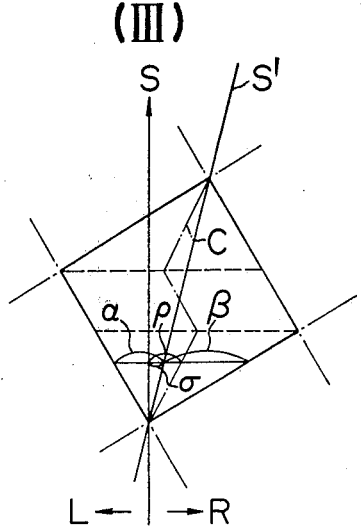

As regards the halftone dot cut away along the picture outline E, if left and right lengths which are obtained by dividing the width of the halftone dot cut away along the outline E, into left and right parts by the scanning line S, are L' and R', the left and the right lengths which are obtained by dividing the width of one whole halftone dot into the left and the right parts by the scanning line S, are L and R, as described above in connection with FIG. 2, and a left or right distance of a point positioned on the outline E away from the scanning line S widthwise are El or Er, the following relations are given.

When $E1 \geq L$, $L' = L$ (1)
When $E1 < L$, $L' = E1$

When $Er \geq R$, $R' = R$ (2)
When $Er < R$, $R' = Er$

In these formulae, L and El may be positive or negative in the left or the right hand side of the scanning line S, and R and Er may be positive or negative in the right or the left hand side of the scanning line S.

From the lengths L' and R' obtained according to the formulae (1) and (2), the length W and the central position p of the line image w are given as follows.

$W = L' + R'$ (provided that, when W is negative, W means nought) (3)

$$p=(L'-R')/2 \text{ (provided that, when W is nought, p does not exist)} \quad (4)$$

A halftone picture comprising halftone dots, some of which are cut away along the picture outline, is recorded by controlling the ultrasonic frequencies supplied to the two deflector elements in the optical system according to the values of W and p obtained from the two formulae (3) and (4).

The fact that the present method can be applied to the halftone dot patterns having various screen angles, will be described.

Figure 4:
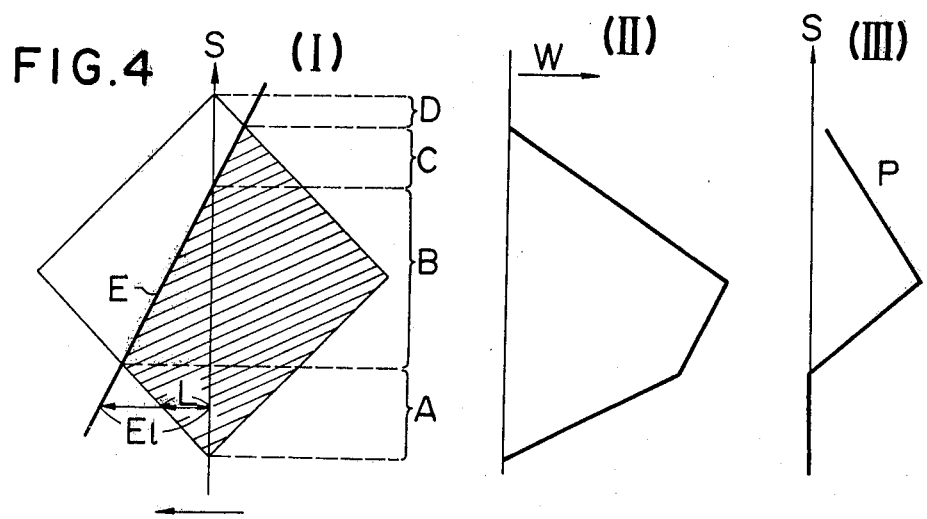
FIG. 4I shows a halftone dot having a screen angle of 0°, wherein the picture outline E cuts away the left part of the dot.

In FIG. 4I is shown a halftone dot having a screen angle 0°, wherein the picture outline E cuts away the left part of the dot. The dot is so divided horizontally into four sections A, B, C and D from the bottom in the levels of the intersection of the outline and the lower edge of the dot, the intersection of the outline and the scanning line, and the intersection of the outline and the upper right edge of the dot.

In the section A, $$W=L'+R', \text{ and } El \geqq L,$$

and therefore, $$L'=L$$

Further, it is understood that another outline for obtaining Er is positioned in the right hand side of the dot. Thus, $$Er>R, \text{ and } R'=R$$

Therefore, $$W=L+R, \text{ and } L=R$$

Accordingly, $$p=(L'-R')/2=(L-R)/2 \ (=0)$$

In the section B, $$0 \leqq El<L, \text{ and } Er>R$$

Therefore, $$W=El+R=L'+R'$$

$$p=(El-R)/2=(L'-R')/2$$

In the section C, $$El<0, \text{ and } Er>R$$

Thus, $$W=R-|Er|=El+R=L'+R'$$

$$p = -|El| - \frac{R - |El|}{2} = \frac{-|El| - R}{2} = \frac{L' - R'}{2}$$

In the section D, $$|El| \geqq R$$

Therefore, $$El+R>0, \text{ and } W=0$$

In FIGS. 4II and 4III, there are shown graphs of the values W and p obtained as described above, respectively.

Figure 5:
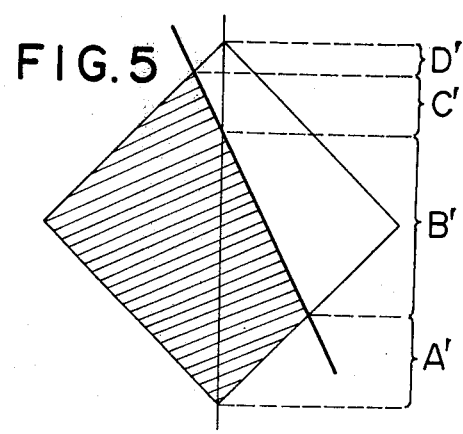
FIG. 5 shows a halftone dot having a screen angle of 0°, wherein the picture outline (E) cuts away the right part of the dot.

In FIG. 5 is shown a halftone dot having a screen angle 0°, wherein the picture outline E cuts away the right part of the dot. The dot is divided into four sections A', B', C' and D' in the same manner as that of FIG. 4I.

In the section A', $$Er \geqq R, \text{ and } El>L$$

Hence, $$R'=R, \text{ and } L'=L$$

$$W=L'R, \text{ and } p=(L-R)/2 \ (=0)$$

In the section B', $$0 \leqq Er<R, \text{ and } El>L$$

Therefore, $$R'=Er, \text{ and } L'=L$$

$$W=L+Er=L'+R'$$

$$p=(L-Er)/2=(L'-R')/2$$

In the section C', $$Er<0, \text{ and } El>L$$

Thus, $$R'=Er, \text{ and } L'=L$$

$$W=L-|Er|=L+Er=L'+R'$$

$$p = |Er| + \frac{L - |Er|}{2} = \frac{L + |Er|}{2} = \frac{L' - R'}{2}$$

In the section D', $$|Er|>L$$

Hence, $$L'+R'<0, \text{ and } W=0$$

Figure 6:
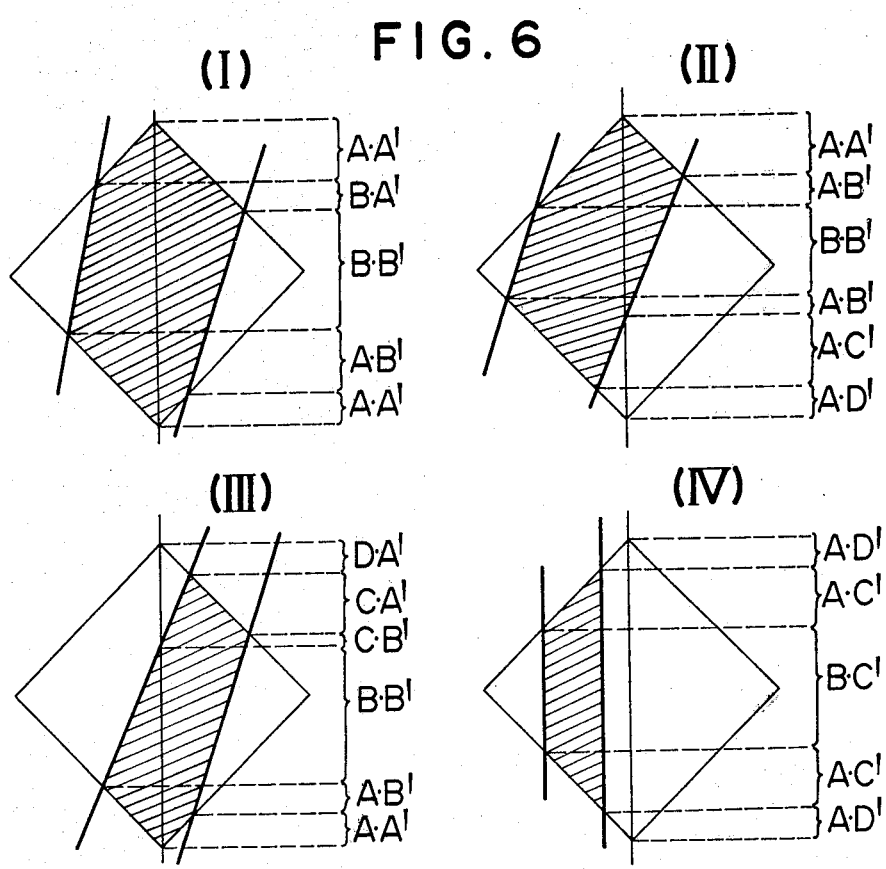
FIGS. 6I, 6II, 6III or 6IV shows respectively a halftone dot having a screen angle of 0°, wherein two outlines cut the left and right parts of the dot.

In FIGS. 6I, 6II, 6III, or 6IV, there is shown a halftone dot having a screen angle 0°, wherein two outlines cuts the left and the right parts of the dot. The halftone dot is divided horizontally into sections, each section is expressed by a combination of each section A, B, C or D in FIG. 4I and each section A', B', C' or D' in FIG. 5, as shown in FIG. 6.

In the section A.A', $$El \geqq L, \text{ and } Er \geqq R$$

Thus, $$W=L+R=L'+R'$$

$$p=(L-R)/2=(L'-R')/2$$

In the section A.B′, $El \geqq L$, and $0 \leqq Er < R$ $W = L + Er = L' + R'$ $p = (L - Er)/2 = (L' - R')/2$ In the section A.C′, $El \leqq L$, and $Er < 0$ $W = L - |Er| = L + Er = L' + R'$ $p = |Er| + \dfrac{L - |Er|}{2} = \dfrac{L + |Er|}{2} = \dfrac{L' - R'}{2}$ In the section A.C′, $El \leqq L$, and $Er < 0$ $W = L - |Er| = L + Er = L' + R'$ $p = |Er| + \dfrac{L - |Er|}{2} = \dfrac{L + |Er|}{2} = \dfrac{L' - R'}{2}$ In the section A.D′, $L' + R' = L - |Er| < 0$ $W = 0$ In the section B.A′, $0 \leqq El < L$, and $Er > R$ $W = El + R = L' + R'$ $p = (El - R)/2 = (L' - R')/2$ In the section B.B′, $0 \leqq El < L$, and $0 \leqq Er < R$ $W = El + Er = L' + R'$ $p = (El - Er)/2 = (L' - R')/2$ In the section B.C′, $0 \leqq El < L$, and $Er < 0$ $W = El - |Er| = El + Er = L' + R'$ $p = |Er| + \dfrac{E1 - |Er|}{2} = \dfrac{E1 + |Er|}{2} = \dfrac{L' - R'}{2}$ In the section B.D, $L' + R' = El - |Er| < 0$ $W = 0$ In the section C.A′, $El < 0$, and $Er > R$ $W = R - |El| = El + R = L' + R'$ $p = -|E1| - \dfrac{R - |E1|}{2} = \dfrac{-|E1| - R}{2} = \dfrac{E1 - R}{2} = \dfrac{L' - R'}{2}$ In the section C.B′, $El < 0$, and $0 \leqq Er < R$ $W = Er - |El| = El + Er = L' + R'$ $p = -|E1| - \dfrac{Er - |E1|}{2} = \dfrac{-|E1| - Er}{2} = \dfrac{L' - R'}{2}$ In the section C.C′, $El < 0$, and $Er < 0$ $L' + R' = -|El| - |Er| < 0$ $W = 0$ In practice, this situation does not appear, but it is theoretically expressed as above.

In the section D.A′, D.B′, or D.D′, $L' + R' < 0$ $W = 0$

From the above description, it is understood that the formulae (3) and (4) are satisfied in any cases when the screen angle of the dot is 0°.

Figure 7:
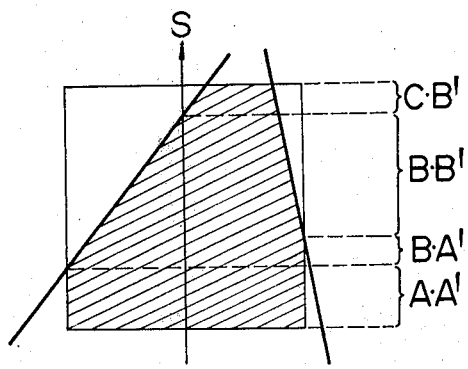
FIG. 7 shows a halftone dot having a screen angle of 45°, wherein two outlines cut the left and the right parts of the dot.

This theory may be applied to a halftone dot having a screen angle 45° in the same manner, as shown in FIG. 7, wherein the two outlines cuts away the left and the right parts of the dot.

In the embodiment of FIG. 7, the dot is divided horizontally into four sections A.A′, B.A′, B.B′, and C.B′. In each section, the same theory as above is satisfied, and sections of other conditions are similar. Hence, the formulae (3) and (4) are satisfied in any cases when the screen angle of the dot is 45°.

Then, when the screen angle of the dot is 15°, the theory will be examined.

Figure 8:
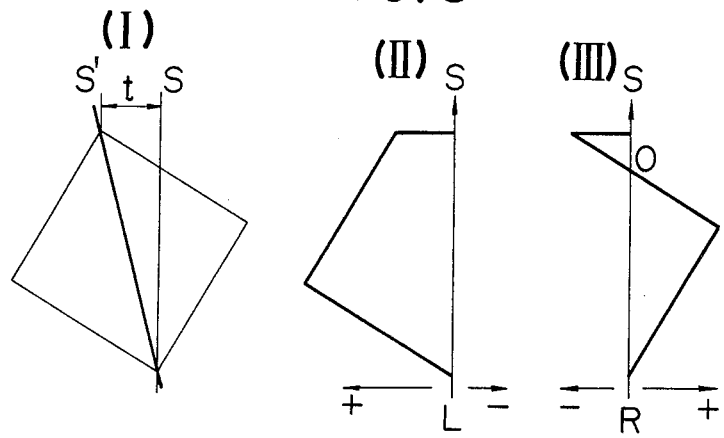
FIG. 8I shows a halftone dot having a screen angle of 15°.

In FIG. 8I is shown a halftone dot having a screen angle 15°, and FIGS. 8II and 8III show graphs of the variations of the values L and R for recording the halftone dot, in which L is always positive, but R varies from a positive value to a negative value at a zero point.

When the screen angle of the dot is −15°, it is apparent that a halftone dot may be shown in symmetrical image of FIG. 8I, and the values L and R may be shown in symmetrical images of the graphs of FIGS. 8II and 8III.

Figure 9:
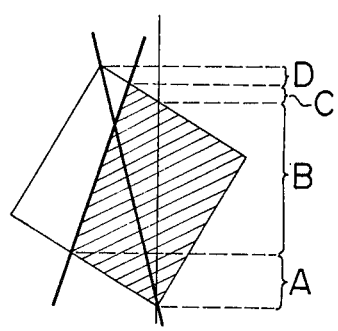
FIGS. 9 and 10 show a halftone dot having a screen angle of 15°, wherein the outline (E) cuts away the left part of the dot.
Figure 10:
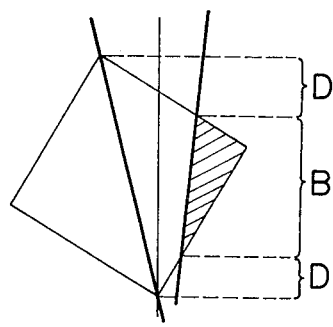

In FIGS. 9 or 10 is shown a halftone dot having the screen angle 15°, wherein the outline E cuts away the left part of the dot. The halftone dot is divided horizontally into A–D sections in a similar manner to FIG. 4I.

In the section A, $El \leqq L$, and $Er > R$ $W = L + R = L' + R'$ $p = (L - R)/2 = (L' - R')/2$ In the section B, $El < L$, and $Er > R$ $W = El + R = L' + R'$ $p = (El - R)/2 = (L' - R')/2$ In the section C, $El < L$, and $Er > R$ (R is negative)

$W = El - |R| = El + R = L' + R'$ $$p = \frac{El - |R|}{2} + |R| = \frac{El + |R|}{2} = \frac{El - R}{2} = \frac{L' - R'}{2}$$

In the section D, $El + R < 0$ $W = 0$

Figure 11:
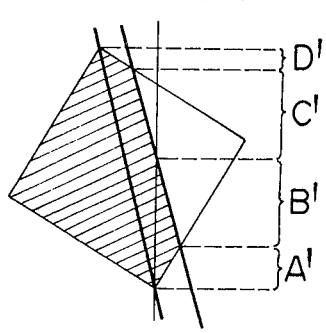
FIGS. 11 and 12 shows a halftone dot having a screen angle of 15°, wherein the outline (E) cuts away the right part of the dot.
Figure 12:
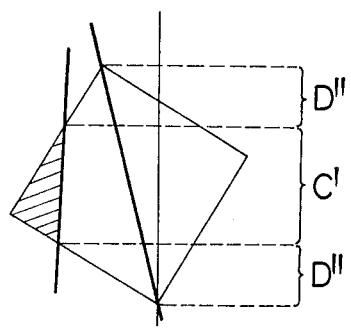

In FIGS. 11 or 12 is shown a halftone dot having the screen angle 15°, wherein the outline E cuts away the right part of the dot. The dot is divided horizontally into A'–D' sections in a similar way to FIG. 5. In FIG. 12, the dot is divided into C' and D" sections.

In the section A', $El > L$, and $Er \geq R$ $W = L + R = L' + R'$ $p = (L - R)/2 = (L' - R')/2$ In the section B', $El > L$, and $Er < R$ $W = L + Er = L' + R'$ $p = (L - Er)/2 = (L' - R')/2$ In the section C', $El < L$, and $Er > R$ (Er is negative)

$W = L - |Er| = L + Er = L' + R'$ $$p = |Er| + \frac{L - |Er|}{2} = \frac{L + |Er|}{2} = \frac{L - Er}{2} = \frac{L' - R'}{2}$$

In the section D', $El < L$, and $Er < R$ (Er and R are negative)

$W = L - |R| = L + R = L' + R'$ $$p = |R| + \frac{L - |R|}{2} = \frac{L + |R|}{2} = \frac{L - R}{2} = \frac{L' - R'}{2}$$

In the section D", $Er < R$, and $|Er| > L$ $L' + R' < 0$ $W = 0$

Figure 13:
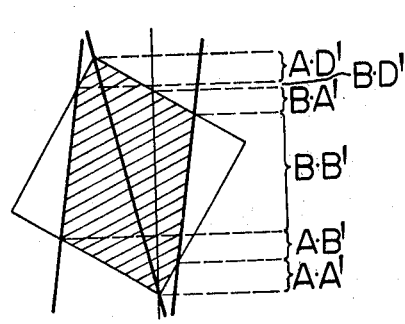
FIGS. 13 and 14 show a halftone dot having a screen angle of 15°, which is cut away in its left and right parts by the two outlines.
Figure 14:
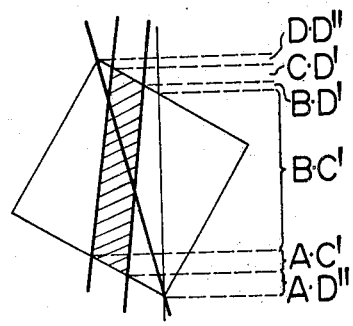

In FIGS. 13 or 14 there is shown a halftone dot having the screen angle 15°, which is cut away in its left and right parts by the two outlines. The dot is divided into sections, each section is represented by a combination of two of the sections A–D, and A'–D" shown in FIGS. 9–12, in a similar manner to FIG. 6. In each section, the formulae (3) and (4) are satisfied, and this is proved in a similar manner to the description of the FIG. 6.

Figure 15:
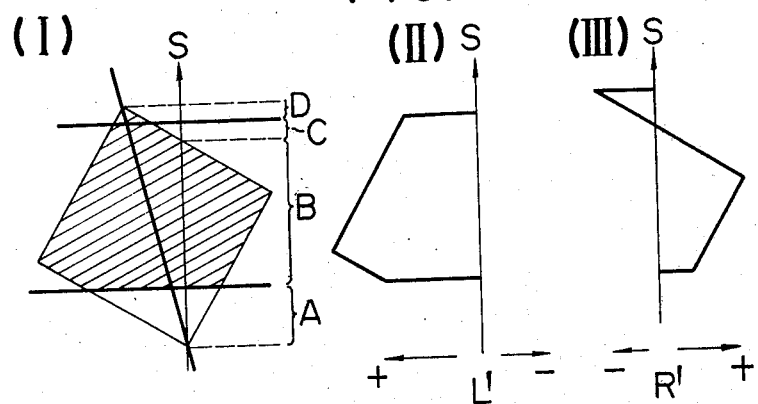
FIG. 15I shows a halftone dot having a screen angle of 15°, in which the two outlines E perpendicular to the scanning line S cut away the upper and the lower parts of the dot.

In FIG. 15I is shown a halftone dot having the screen angle 15°, in which the two outlines E perpendicular to the scanning line S cuts away the upper and the lower parts of the dot. FIGS. 15II and 15III show graphs of the values L' and R'.

In this case, the dot is cut along the outlines by using one of the values El and Er or both the values El and Er.

When El and Er are used, as shown in FIG. 15I, it is assumed that in the sections A and D, El and Er equals nought and that in the sections B and C, El is larger than L and Er is larger than R.

In the section A, $El < L$, and $Er < R$ $W = El + Er = L' + R' = 0$ $p = (El - Er)/2 = (L' - R')/2 = 0$ In the section B, $W = L + R = L' + R'$ $p = (L - R)/2 = (L' - R')/2$ In the section C, $W = L - |R| = L + R = L' + R'$ $$p = |R| + \frac{L - |R|}{2} = \frac{L + |R|}{2} = \frac{L' - R'}{2}$$

In the section D, $W = El + Er = L' + R' = 0$

Figure 16:
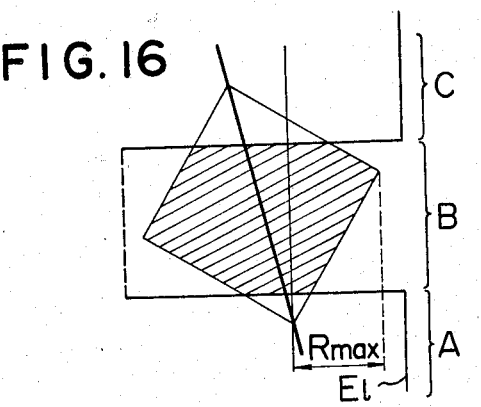
FIG. 16 shows a case when only $E_1$ is used in two sections wherein the dot is cut away.

When only El is used, as shown in FIG. 16, in the sections A and C wherein the dot is cut away, the value of El is determined as follows.

$El < -|R_{max}|$

In this case, in the sections A and C, $El < L$, and $Er > R$ $L' + R' = El + R < 0$ $W = 0$ When only Er is used, the value of Er is determined in the following, in the same manner as described above.

$Er < -|L_{max}|$

From the above description, it is proved that if the conditions represented in the formulae (1) and (2) are satisfied, the width W and the central position p of the line image w, for recording the halftone dot cut along the outline, are obtained according to the formulae (3) and (4).

The values L, R, El and Er are determined as follows. That is, the values L and R depend on a screen angle and a halftone dot area. The necessary values L and R obtained depending on the screen angles and the halftone dot areas desired are stored in a memory in advance, and are read out in synchronization with scanning when a reproduction picture is recorded by a scanning exposure head by scanning. One embodiment of this technique is disclosed in the Japanese Patent Laying-Open Specification No. 54-79701 (Japanese Patent Application No. 52-145683) and the detailed description can be omitted.

The values El and Er depend on the contents of a pattern of an original picture to be reproduced and are obtained depending on the picture signals obtained by scanning the original picture photoelectrically.

For example, the picture signals of a plurality of adjacent scanning lines are simultaneously stored in the memory in parallel, and then the values of El and Er are obtained by handling the picture signals stored, such as detecting the position and the orientation of the outline from a certain area of picture signals. Such method is disclosed in the Japanese Patent Laying-Open Specification No. 54-98805 (Japanese Patent Application No. 53-4855).

In FIG. 17 there is shown a control device for reproducing a halftone dot cut away along an outline of a halftone picture according to the present invention.

The signals L and El are fed to a comparator 11 which compares the two signals and outputs a control signal 15 to a selector 13. The signals R and Er are fed to a comparator 12 which compares the two signals and outputs a control signal 16 to a selector 14.

In the selector 13 the signals L and El are supplied and the selector 13 selects one of the two signals L and El by means of the control signal 15 and outputs it as the signal L'. That is, the comparator 11 compares the signals L and El, and when $El \geq L$ or When $El < L$, the selector 13 outputs the signal L or El as the signal L'.

In the selector 14 the signals R and Er are fed, and when $Er \geq R$ or when $Er < R$, the selector 14 outputs the signal R or Er as the signal R' in the same manner as the selector 13.

The signals L' and R' are sent to two operational circuits 17 and 18 in parallel. The operational circuit 17 operates $L' + R'$, and the operational circuit 18 operates $(L' - R')/2$. The output signal $L' + R'$ from the operational circuit 17 is sent to a gate 19 and a level detector 20.

The level detector 20 detects the positive or negative level of the signal $L' + R'$. When the signal $L' + R'$ is negative, the level detector 20 actuates the gate 19 to close. When the signal $L' + R'$ is positive, the gate 19 outputs the signal $L' + R'$ as the signal W.

The operational circuit 18 always outputs the signal $(L' - R')/2$ as the signal p. However, when ths signal $L' + R'$ is negative, no signal W is output and thus no picture is recorded.

Figure 1:
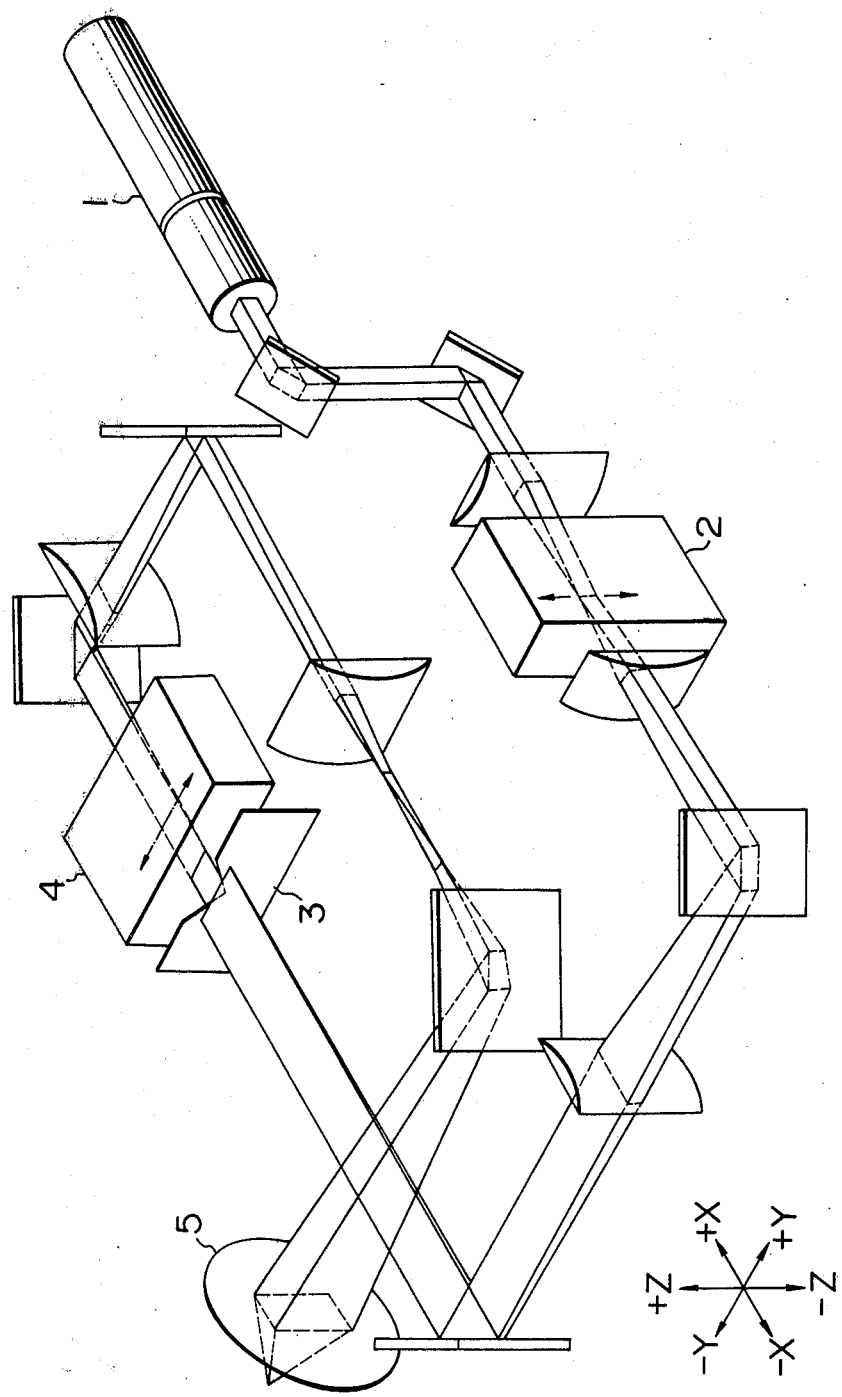
FIG. 1 is a perspective view of a conventional optical system of a device for reproducing a halftone picture by scanning.

Depending on the signals W and p obtained, the frequencies of the ultrasonic waves to be supplied to the deflector elements shown in FIG. 1 are controlled so that the light beam may be deflected at the proper diffraction angles by the deflector elements.

Although the present invention has been shown and described in terms of a preferred embodiment thereof, however, various changes and modifications can be made by those skilled in the art without departing from the scope of the present invention.

For example, of course, the screen angles are not restricted to 0°, 15° and 45°, and any angle may be applied to the present invention.

What is claimed is:

1. In a method for reproducing a halftone picture by scanning, wherein a recording light beam to be projected on a photosensitive material is suitably controlled in the horizontal and vertical directions by means of picture signals obtained from the scanning of an original picture and wherein said signals are output in synchronism with scanning when a reproduction picture is recorded, a control method for reproducing a halftone dot cut away along an outline of the picture, comprising the steps of:

(a) detecting a position of an outline in an original picture;
   (b) comparing the width of a halftone dot area to be recorded with the detected position of said outline; and
   (c) projecting the recording light beam onto the photosensitive material only over the range of the halftone dot area within the outline by selecting the smaller of either the width or outline position as the control signal.

2. A method as defined in claim 1, wherein the halftone dot has a certain screen angle.

3. In a machine for reproducing a halftone picture by scanning, wherein a brightness and a width of a recording light beam to be projected on a photosensitive material is suitably controlled by means of picture signals obtained from the scanning of an original picture, a control device for reproducing a halftone dot cut away along an outline of the picture, comprising:

(a) a width signal generator which outputs a width signal corresponding to a width of a halftone dot to be recorded;
   (b) a position signal generator which outputs an outline position signal corresponding to a position of an outline in an original picture;
   (c) a selector which compares the width signal and the outline position signal and selects the smaller one of the two signals; and
   (d) a controller which controls the length of the recording light beam according to the signal selected.

4. A device as defined in claim 3, wherein the controller controls also the central position of the recording light beam according to the selected signal.

5. A device as defined in claim 3 or 4, wherein the halftone dot has a certain screen angle.

* * * * *